Sept 10, 1957      M. J. UDY      2,805,930
PROCESS OF PRODUCING IRON FROM IRON-OXIDE MATERIAL
Filed March 10, 1953      2 Sheets-Sheet 2

INVENTOR
Marvin J. Udy
ATTORNEY

2,805,930
Patented Sept. 10, 1957

2,805,930

PROCESS OF PRODUCING IRON FROM IRON-OXIDE MATERIAL

Marvin J. Udy, Niagara Falls, N. Y., assignor to Strategic-Udy Metallurgical & Chemical Processes Limited, Hamilton, Ontario, Canada Application March 10, 1953, Serial No. 341,413

6 Claims. (Cl. 75—11)

This invention relates to metallurgy and has for an object the provision of an improved method or process for producing metallic iron. More particularly, the invention contemplates the provision of a method or process which can be employed advantageously and economically to produce high-grade metallic iron products from iron oxide-bearing materials, including various grades of iron ore such as the usual commercial ores and some ores of too low-grade to be treated commercially by means of heretofore customary methods or processes. The invention further contemplates the provision of a method or process which can be employed advantageously and economically to produce high-grade metallic iron products from various grades of iron ore through the use of various grades and types of carbonaceous reducing materials, including the usual commercial carbonaceous reducing materials such as high-grade coal and coke and some carbonaceous reducing materials such, for example, as low-grade coal, wood and wood shavings of too poor quality metallurgically to be employed commercially in heretofore customary methods or processes for recovering iron from iron ores. A further object of the invention is to increase the capacities of arc electric furnaces for iron reduction and permit their use competitively with iron blast furnaces. A specific object of the invention is to provide a process of the type set forth which will further increase the capacities of arc electric furnaces to produce molten metallic iron-bearing products of commercial quality through the conjoint use of iron oxide-bearing material and metallic iron-bearing scrap in the production of furnace charges.

The invention utilizes heat contaned in molten slag as the source of heat for promoting reduction to the metallic state of iron contained in iron oxide. In a process of the invention, a charge comprising (1) iron oxide-bearing material, (2) metallic iron-bearing material such as light scrap iron, (3) fluxing material for combining with gangue material contained in the iron oxide-bearing material, and (4) solid carbonaceous material is placed on the surface of a molten slag bath maintained at a temperature sufficiently high to provide substantially all of the heat required for melting the fluxing material and gangue material of the charge with the production of molten slag, for melting the metallic iron-bearing material and for promoting and effecting reduction of the iron of the iron oxide-bearing material of the charge by means of the carbonaceous reducing material of the charge with the production of molten metallic iron which is separated from the molten slag.

The invention permits the advantageous use of finely divided iron oxide-bearing material, light scrap iron or steel such as borings and turnings. In practicing the invention, finely divided iron oxide-bearing material is mixed with finely divided fluxing material, finely divided light scrap iron or steel and finely divided solid carbonaceous material to form a finely divided charge in which the components are intimately mixed. The light scrap iron or steel may be employed in a somewhat coarser form than the other components of the charge. Intimate mixing of the components of the charge in finely divided forms promotes reduction of the iron of the iron oxide and facilitates the production of metallic iron and the recovery of the iron of the iron oxide-bearing material and the scrap in the metallic state when the charge comprising the intimately mixed components is placed on the surface of the molten slag bath.

Iron oxide-bearing material containing iron in the ferrous state as ferrous oxide or in the ferric state as ferric oxide or in both the ferrous state and the ferric state may be employed in carrying out a process in accordance with the invention.

I prefer to employ combined electric arc and resistance heating (arc-resistance heating) for maintaining the slag bath at a temperature high enough to provide the heat required for melting the metallic iron-bearing material and the fluxing material of the charge and for promoting and effecting reduction of the iron of the iron oxide-bearing material by means of the carbonaceous reducing material. Combined electric arc and resistance heating as employed in accordance with my invention involves the utilization of heat developed by one or more arcs extending between the arcing tips of the electrodes and the upper surface of a molten slag bath plus heat developed as the result of the resistance of the slag bath to the flow of electric current therethrough in passing or flowing between the electrodes.

When employing finely divided iron oxide-bearing material in forming a charge for reduction, I prefer to employ coal as the solid carbonaceous component of the charge, preferably, coal having coking or fusing properties, if available, and to heat the charge mixture to a temperature above the fusing or coking temperature of the coal prior to placing the charge on the surface of the molten slag bath. By employing coal and particularly coal having coking or fusing properties, I obtain several advantages. Thus, in using coal of any type as the solid carbonaceous reducing material, I effect a substantial reduction in the cost of the reducing material as compared with the cost of the coke commonly employed in iron reduction and recovery processes. In employing coal having fusing or coking properties and heating a charge mixture to a temperature above the fusing or coking temperature of the coal, I effect a more stable and, thus, a more effective intimate mixing of the components of the charge, for the coal upon fusing or coking functions as bonding material for the other components of the charge, and the tendency for the particles to separate or segregate, which characterizes loose mixtures of finely divided materials, is substantially completely avoided or eliminated. If desired, heating of the charge prior to placing it on the surface of a molten slag bath may be controlled to effect reduction to the ferrous state or to the metallic state of a portion of the iron of iron oxide contained in the charge. In practicing the invention when employing coal having fusing or coking properties, I prefer to carry out the heat treatment for the purpose of effecting fusing or coking by passing the charge mixture through a rotary kiln or other suitable apparatus under reducing conditions and provided with suitable heating means wherein the tumbling of the charge will maintain the components of the charge in the desired intimately mixed state while they still are in the finely divided condition so that when fusing or coking takes place the components will become fixed in the desired intimate association, and a substantially homogeneous charge will be formed. Heating of the charge serves to effect vaporization of the volatile matter of the coal with the resulting two-fold advantage of providing volatile combustible material which can be and preferably is burned to provide a portion of the heat required for the heat treatment and avoiding the introduction into the electric furnace of the volatile matter of the coal with the attendant disadvantage resulting from gasification of the volatile matter within the electric furnace. Tumbling of the charge during the heat treatment for coking purposes insures the production of granular free-flowing material which can be subjected to the subsequent reducing treatment more advantageously than can lumpy material. Granular material promotes ease of handling and charging and, also, facilitates reduction. Generally, fusing or coking to a suitable extent or degree can be effected at a temperature of about 500° C. to 600° C. The preliminary heating and reducing treatment may be carried out at any suitable temperature between 500° C. and about 1300° C. Preferably, the product of the heating and reducing treatment is placed on the surface of a molten slag bath while maintained near the temperature to which it is heated or without substantial dissipation of heat absorbed during the course of the heating and reducing treatment having been permitted.

Control of the preliminary heating of the charge to effect reduction of a portion of the iron of the iron oxide provides the additional advantage of reducing the danger resulting from blowing, when the charge is to be treated subsequently in an electric arc furnace, by reducing the amount of oxygen that must be combined with carbon, and expelled in the form of carbon monoxide, for the production of a given amount of metallic iron in the arc electric furnace.

In employing combined electric arc and resistance heating (arc-resistance heating) for maintaining the molten slag bath at the desired temperature, I prefer to employ a covered electric arc furnace provided with one or more vertically extending electrodes. In operating such a furnace during the course of a process of the invention, I maintain the arcing tips of the one or more electrodes in sufficiently close proximity to the upper surface of the molten slag bath to inhibit dissipation of the arc-developed heat by reflection and to insure delivery to the molten slag bath of substantially all of the arc-developed heat, and I introduce charge material into the furnace and onto the surface of the molten slag bath therein at a rate such as to maintain a low-pressure zone adjacent the arcing tips of the one or more electrodes.

The establishment of low-pressure zones results in avoidance of the frequent periodic blowing of the charge out of the furnace with the consequent danger to operators and disturbance of the operation that takes place because of unpredictable and uncontrollable rates of reaction and high pressure created by establishing deep beds of charge material around the electrodes in accordance with heretofore customary practices.

Introduction of charge into the interior of the electric furnace is carried out at a rate such that it is deposited on the surface of the molten bath between the furnace walls and the electrodes without flowing into contact with the electrodes or at a rate such that it flows into contact with the electrodes and builds up around the electrodes to a depth of only a few inches.

The use of a covered arc electric furnace providing combined electric arc and resistance heating (arc-resistance heating) in accordance with the invention permits effective control of carbon in the molten iron produced. Thus, for example, if the amount of carbonaceous material contained in the charge introduced into the electric furnace is substantially equivalent to the amount required theoretically to reduce the iron of the iron oxide contained in the charge, a molten metallic iron product containing not more than about two percent (2%) carbon by weight will be produced. By further restricting the amount of carbonaceous material in the charge to amounts lower than the amount required theoretically to reduce the iron of iron oxide contained in the charge, molten metallic iron products containing varying amounts of carbon from about two percent (2%) to less than one percent (1%) can be produced. By incorporating in the electric furnace charge various amounts of carbon in excess of the amount required theoretically to reduce the iron of iron oxide contained in the charge, molten metallic iron products containing carbon in amounts between two percent (2%) and the amounts contained in ordinary pig iron can be produced.

In carrying out a process in accordance with the invention, all of the carbonaceous material to be employed for reduction of the iron of iron oxide in the electric furnace may be introduced into the furnace in admixture with the other components of the reducing charge, or a portion may be introduced into the furnace in admixture with the other components of the total charge, and a portion may be introduced into the arc electric furnace separately.

Dissipation of the arc-developed heat by reflection may be inhibited satisfactorily by maintaining arcs not greater in length than about one-half inch. A zone of suitably low pressure adjacent to the one or more electrodes may be maintained by limiting the depth of charge material immediately adjacent to the one or more electrodes to a maximum of twelve (12) inches.

In operating the electric furnace employing combined electric arc and resistance (arc-resistance) heating in accordance with the invention, the tips of the one or more electrodes preferably are maintained in positions with respect to the vertical ranging between about one-half inch (½") above the surface of the slag bath and two inches (2") below the surface of the slag bath. Immersion or penetration of the one or more electrodes in or into the molten slag bath to a depth short of that which will permit wetting of the electrodes by the slag will permit retention of the arc-resistance heating character of the operation with utilization constantly of arc-developed heat plus heat developed by the resistance of the slag of the slag bath to the flow of electric current therethrough between the electrodes. Tapping of the furnace is controlled to maintain in the furnace a slag bath having a depth not less than about three inches (3") in order always to maintain between the arcing tips of the electrodes and the metal beneath the slag bath a layer of slag at least one inch (1") in depth.

Maintenance constantly within a furnace of a molten slag bath of proper depth with a layer of molten slag disposed between the arcing tips of the electrodes and molten metal beneath the slag bath permits the use of substantially constant voltages at substantially constant power factor and provides for smooth furnace operations.

Through operation of the furnace constantly as an arc-resistance furnace with short arcs and constant or substantially fixed resistance through control of the depth of the molten slag bath and the positions of the electrodes, I am able to operate substantially constantly at power factor of about 95% or better as compared with power factors of 75% to 85% at which electric steel furnaces are operated in accordance with the heretofore customary practices.

In the operation of the arc electric furnace, automatic electrode regulators are set to maintain and do maintain the electrodes in constant or substantially fixed positions relatively to the surface of the molten slag bath, because, for a particular type of operation, the slag is of substantially constant composition and, therefore, of substantially constant resistance. When an increase or decrease in the temperature of the molten slag bath is desired for a particular operation, the voltage is increased or decreased and the electrode regulator is adjusted to maintain the arc length within the desired range (equivalent to the arc length established by maintaining the arcing tips of the electrodes in a position relatively to the vertical between about one-half (½") inch above the surface of the slag bath and two inches (2") below the surface of the slag bath). In following this procedure, the resistance is maintained constant and, consequently, the power input is increased or decreased.

I prefer to employ an arc electric furnace having a holding capacity of fifty (50) to one hundred (100) or more tons of molten iron and, in carrying out a process in accordance with the invention, I prefer to tap the furnace at intervals when the amount of molten iron in the furnace is equal to or substantially equal to the holding capacity of the furnace. The production of such large batches provides molten metal in quantities large enough to contain sufficient sensible heat to permit transfer in ladles to casting locations or other furnaces without objectionable skull formation occurring.

In accordance with the invention, the iron oxide-bearing material may be subjected to one or more treatments involving the use of heat for effecting the reduction of iron to the metallic state and the production of a molten metallic iron product and a molten slag product. Thus, for example, (1) the iron oxide-bearing material may be incorporated in a solid charge comprising light scrap iron or steel, carbonaceous reducing material and suitable fluxing material, and the solid charge, without pre-heating or without pre-heating to degree that would alter materially its initial composition with respect to iron oxide, may be placed on the surface of a molten slag bath maintained at a temperature sufficiently high to provide the heat required to effect a desired economic or substantially complete reduction of iron with the production of molten metallic iron and molten slag; or (2) a charge comprising the iron oxide-bearing material, light scrap iron or steel, carbonaceous reducing material and suitable fluxing material may be subjected to a preliminary heating treatment to effect reduction to the metallic state of a portion of the iron of the iron oxide-bearing material with the production of a granular product, and the granular product of the preliminary heating treatment may be placed on the surface of a molten slag bath maintained at a temperature sufficiently high to provide the heat required to effect melting of metallic iron produced in the preliminary heating treatment and a desired economic or a substantially complete reduction of residual un-reduced iron of the iron oxide-bearing material with the production of molten metallic iron and molten slag; or (3) in the treatment of iron oxide-bearing material containing one or more non-ferrous elements such as copper, nickel, cobalt and iron, a solid charge comprising the iron oxide-bearing material, light scrap iron or steel, suitable fluxing material and carbonaceous reducing material in a limited amount sufficient to effect the reduction to the elemental state of the non-ferrous element may be placed directly (without being subjected to a preliminary heating treatment), or after having been subjected to a preliminary heating treatment, on the surface of a molten slag bath maintained at a temperature sufficiently high to provide the heat required to effect desired reduction and melting with the production of a molten metallic product containing the non-ferrous element or elements and a molten slag product containing iron oxide, and the molten slag product together with sufficient carbonaceous reducing material to effect reduction of the desired amount of iron of the iron oxide contained in the slag may be placed in a furnace containing a molten slag bath maintained at a temperature sufficiently high to provide the heat required for reduction of the iron of the iron oxide with the production of molten metallic iron and molten slag.

Preferably, the furnace into which is placed the molten iron oxide-bearing slag resulting from the operation carried out to produce a metallic product containing non-ferrous metals is an arc-electric furnace provided with one or more vertically extending electrodes and operated in accordance with the principles and practices hereinbefore set forth with respect to such factors as control of arc length, relative positions of arcing tips of electrodes and surfaces of molten slag baths, inhibition of dissipation of arc-developed heat and utilization of arc-developed heat plus heat developed as the result of resistance of the slag to the flow or passage therethrough of electric current between electrodes.

Preliminary heating of a charge to effect granulation with controlled reduction of iron to the metallic state, in accordance with the invention, may be carried out at temperatures between about 500° C. and the melting point of the metallic iron produced. Preferably, reduction is carried out at a temperature in the upper portion of the range extending from 500° C. to the melting point of metallic iron that may be produced. A suitable temperature for promoting reduction of iron with the production of a suitable granular product is one just at or just below the fusing temperature of the slag—a temperature, preferably, at which sufficient softening of the charge undergoing the reduction treatment to produce a sintered or fritted, free-flowing granular product takes place. Adjustment of the proportions of slag-forming materials present in the charge may be carried out advantageously to provide for effective reduction at sintering temperatures or temperatures of incipient fusion in the range of about 1100° C. to 1300° C.

A preferred complete process of the invention comprises two or more steps, depending on the composition of the ore treated, including a preliminary low-temperature reduction step and a melting step. When iron is the only economically recoverable metallic element present in the ore, or, when a single metallic product comprising the iron of the ore alone or comprising the iron and any other metallic element present in the ore is sought, the preferred complete process of the invention for the production of a metallic iron-bearing product may consist of a low-temperature reduction step for the production of a sintered granular product comprising reduced metallic iron and a melting and reducing step designed to receive and treat the sintered product for the production of a molten bath comprising separable layers of molten metal and molten slag.

In accordance with a process of the invention, a finely divided charge comprising iron oxide ore or other iron oxide-bearing material, light scrap iron or steel, fluxing material and solid carbonaceous material is subjected to a preliminary heat treatment and heated to a sintering temperature (temperature of incipient fusion) to effect (1) reduction to the metallic state of at least a portion of the iron of the iron oxide of the charge, (2) chemical combination of at least a portion of the unreduced iron oxide, fluxing material and gangue material of the charge, and (3) the production of a granular, substantially free-flowing product comprising the metallic iron produced, the metallic iron of the scrap iron or steel and the chemically combined iron oxide, fluxing material and gangue material, the granular product of the heating and reducing treatment is placed on the surface of a molten slag bath maintained at a temperature sufficiently high to promote melting of the non-carbonaceous components of the granular charge and reduction of iron oxide by means of carbonaceous reducing material with the production of molten metallic iron and molten slag, and the molten metallic iron and molten slag are separated. Preferably, the granular product is placed on the surface of the molten slag bath while maintained at a temperature near the temperature of incipient fusion or without substantial dissipation of heat absorbed during the course of the heating and reducing treatment having been permitted.

When a process of the invention is employed for the treatment of an iron ore containing one or more of the non-ferrous metals, nickel, sulphur, cobalt and copper, melting and reducing may be carried out in two stages in the first of which, a molten metallic product containing a large proportion or substantially all of the one or more non-ferrous metals and a small amount of the iron is produced and in the second of which a molten metallic product containing the remainder of the reduced metallic iron is produced. When a process of the invention is employed for the treatment of a high-phosphorous iron ore, a procedure similar to that employed in separating non-ferrous metals may be employed to produce a metallic product comprising some iron and high in phosphorous in a first or preliminary melting and reducing stage and a product comprising the remainder of the iron in a second or principal melting and reducing stage. In a process for separating a non-ferrous metal or phosphorus involving the use of two melting or reducing stages or steps, the charge introduced onto the surface of a molten slag bath in the furnace employed in the first stage contains only a limited amount of carbonaceous reducing material, carbonaceous reducing material preferably being employed in an amount not substantially greater than that required to reduce the non-ferrous metal or phosphorus and an amount of iron that may be required to act as a solvent or reservoir for the reduced non-ferrous metal or phosphorus. Molten slag from the first stage furnace, which contains the gangue material of the ore, the major portion of the iron oxide of the ore and the fluxing material of the original charge is introduced, together with additional carbonaceous reducing material, onto the surface of a molten slag bath in the furnace employed in the second stage to produce molten metallic iron and molten slag, the amount of carbonaceous material employed being determined by the composition with respect to carbon content of the metallic iron sought to be produced.

For fluxing ore to be treated and producing a suitable reduction charge in accordance with the invention, I incorporate in the charge iron ore, light scrap iron or steel, solid carbonaceous material and fluxing material such as lime (as such or in the form of limestone) and silica, as required, to flux the gangue of the ore and the ash-forming constituents or components of the carbonaceous material. The components of the charge are selected to provide for the production of a slag having a lime-silica molecular ratio in the range, 0.7 to 3.0 molecule of CaO to 1.0 molecule of $SiO_2$. Any suitable lime-silica ratio may be employed in any modification of the process of my invention, but I prefer to employ ratios in the range of about 0.7 to 1.5 CaO to $SiO_2$ for selective reduction of iron to remove phosphorus, sulphur, arsenic, cobalt, nickel etc. and 1.5 to about 2.0 for reduction and refining to iron in the second stage or where high grade iron ores are used in the initial charge and relatively no impurities are involved. In general, when the electric furnace is used for melting and reducing, the higher ratios of CaO to $SiO_2$ may be useful, depending on whether a finished steel or a pig iron end product is desired.

I may incorporate in the charge to be subjected to a preliminary reducing and sintering treatment for the production of a granular product all or any desired portion of the total amount of solid carbonaceous material required, and I may so control the preliminary reducing and sintering treatment, with respect to times, temperatures and additions of fluxing materials, as to effect reduction of iron by means of all or any desired proportion of the carbonaceous material. When an amount of solid carbonaceous material less than the amount required to effect complete reduction is employed, additional solid carbonaceous reducing material may be added to the charge employed in a subsequent melting and reducing operation. When the reducing and sintering treatment is so controlled as to effect reduction by means of a portion only of the solid carbonaceous material, further reduction, by means of the residual carbonaceous material, will be effected in the melting and reducing stage following the reducing and sintering treatment. In a preferred process of the invention, I incorporate in the charge to be subjected to the preliminary reducing and sintering treatment solid carbonaceous reducing material in amount sufficient to reduce all of the iron of the iron ore of the charge, and I so conduct the preliminary reducing and sintering treatment as to effect reduction of a large proportion of the iron, complete reduction not being highly essential since further reduction will take place in the following melting and reducing step.

In forming a charge in accordance with the invention, I prefer to mix intimately the various components including the ore, light scrap iron or steel, solid carbonaceous material, and fluxing material. The components may be crushed to any suitable degrees of fineness and any suitable mixing methods and apparatus may be employed. For most effective mixing, I prefer to grind together in a suitable mill the various nonmetallic components of the charge. A charge in which all of the non-metallic materials are finely divided and a large proportion of the particles are small enough to pass a 10-mesh screen permits effective sintering and reduction with the production of a granular product. Charges comprising smaller particles permit more intimate contact of components and provide for more rapid sintering and reduction. Light scrap iron or steel in the form of one-half inch ($\frac{1}{2}''$) and smaller particles may be employed satisfactorily. Light scrap iron or steel may be incorporated in a charge in any suitable amount. A charge containing about five percent (5%) to twenty percent (20%) by volume of light scrap may be handled and treated with facility.

Sintering preferably is carried out in a reducing atmosphere and at a temperature such that the lime employed for fluxing purposes may enter into chemical combination with silica present in the charge. The lime thus is placed in position to function most effectively as a fluxing agent during the reduction and melting treatments. The sintering treatment may also result in the production of calcium compounds of iron which are more readily reducible than the compounds of iron contained in the original iron ore.

The preliminary reducing and sintering treatment accomplishes a substantial amount of the total work required to be done to recover metallic iron from iron ore and scrap iron and steel. Thus, for example, scrap iron and steel will be heated to a temperature approaching the melting temperature, a large proportion of the iron may be reduced, slag-forming materials are placed in positions where they may function with high efficiencies to form molten slag products in the subsequent melting treatment, solid carbonaceous material is placed in position and condition to function effectively in the subsequent melting and reducing treatment when only partial reduction of iron is accomplished in the preliminary reducing and sintering operation and there is delivered to the melting furnace a granular substantially free-flowing sintered product at a temperature (preferably not lower than about 1000° C.) from which it can be raised rapidly to and through the slag and metal melting temperatures to accomplish effectively completion of the work of reducing, melting and separation of slag and metal products remaining to be done to produce the useful metal.

Any suitable type of furnace may be employed for carrying out the reducing and sintering treatment. I prefer to employ a rotary kiln of the type of a cement kiln or a traveling hearth type sintering furnace, such, for example, as the Dwight-Lloyd sintering furnace or a tunnel kiln.

When operated efficiently for the recovery of iron alone, my process becomes a two stage process in which the reduction and slag formation stage is carried out in a low-temperature range to produce a partially or wholly sintered and partially or wholly reduced product, and the melting and reducing stage is carried out in a high-temperature range in high-temperature equipment to produce molten slag and a molten iron product of a desired composition.

The process of my invention may be operated advantageously to utilize high-phosphorus ores by using two electric melting and reducing furnaces. In the first furnace, a partially reduced sinter produced by employing a charge comprising a limited amount of carbonaceous reducing material and containing iron oxide and some metallic iron is melted to produce a small amount of iron high in phosphorus. The slag from this furnace is tapped into a second furnace and the reduction of the iron oxide completed with additional coke or coal to produce low-phosphorus pig iron or steel as the case may be. The high-phosphorus iron is tapped from the first furnace and cast into pigs. The operation may be carried out in the same furnace, if desired, by tapping out the high-phosphorus iron first and then completing the reduction of the balance of the iron oxide in the slag to produce low-phosphorus iron or steel.

The process of the invention, unlike processes of the heretofore customary type, is capable of high-tonnage production. A rotary kiln of 180 feet length and 8 feet diameter, for example, can be used in the production of at least 240 tons and as much as 500 tons or more of metallic iron per day. This kiln can be used to produce free-flowing charge material for delivery to one or more melting or melting and reducing furnaces. It can also be used to heat the scrap iron and steel. That is, that light scrap, as such as borings and short turnings or shredded turnings, added to the initial charge to be preheated before entering the melting furnace. Large or heavy scrap may be charged into the melting furnace directly.

Larger kilns, 500 to 700 feet in length would, of course, be capable, by reduction alone, of production equaling that of the large modern blast furnace. The use of such kilns would require the use of several melting furnaces of normal size for treatment of the sintered product to produce separable molten slag and molten metallic iron.

Many attempts have been made to accomplish electric furnace smelting of iron ore to produce pig iron, but they have not been economical compared to the blast furnace. In my process, the electric furnace is economical even at the high cost of power in the steel centers of the United States, because the amount of power required is reduced substantially merely to that required for refining, which, in good practice, may be as low as 700 kilowatt hours per ton of metal.

My process further makes possible the operation of larger electric furnaces. The usual electric steel furnace, operating on scrap, operates at a low power factor because of the large amount of inductance required to make the operation smooth. This low power factor is a heavy load on the power generating facilities. In my process, the melting and reducing furnace can readily be designed to operate substantially constantly at 95% power factor, and it thereby increases the efficiency of melting and reduces the burden on the power generating facilities. The process will make more power available through the more efficient use of the present capacity. This is true because the melting takes place at all times under a fairly heavy slag. Molten slag is tapped off at about the same rate at which it is produced, after formation of a suitable fluid slag covering for the metal, so that there is maintained at all times a sufficiently heavy slag layer to provide for efficient melting and for carrying the power into the furnace at high efficiency.

The invention will be better understood from a consideration of the following description in conjunction with the accompanying drawings in which.

Figure 1:
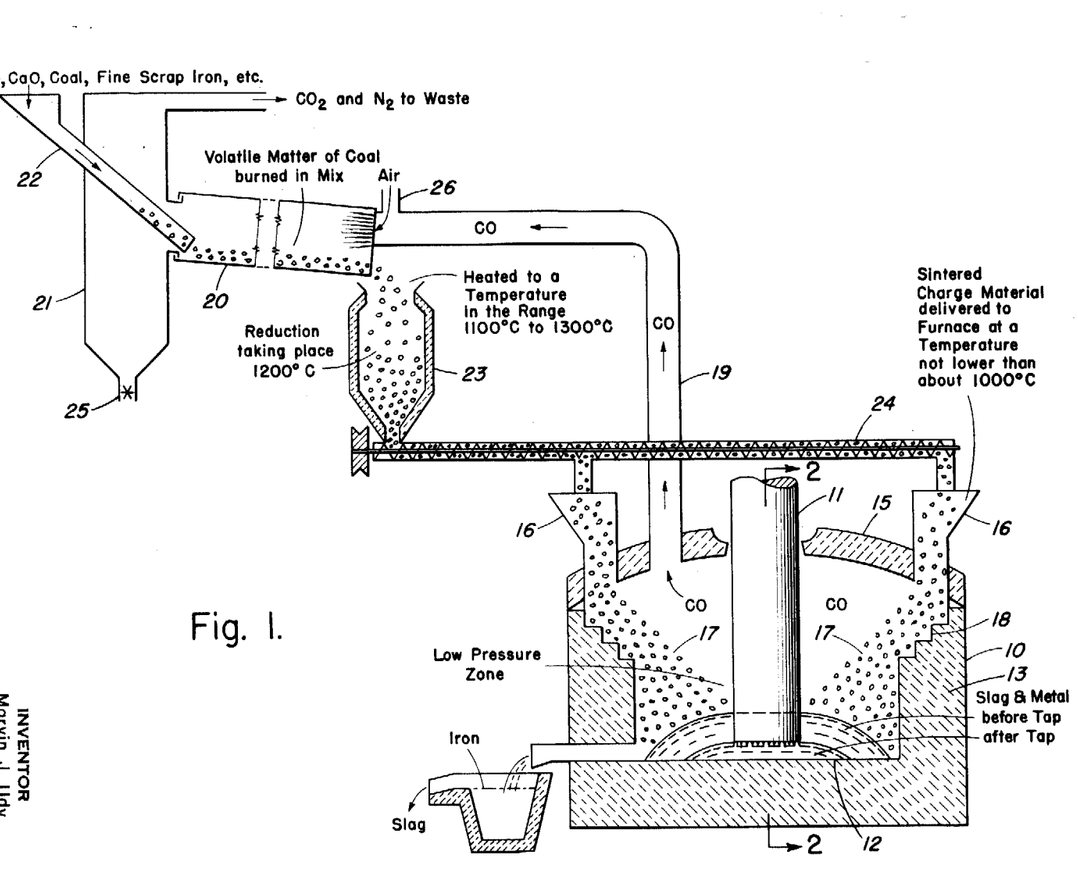
Fig. 1 is an elevation, partly in section and partly schematic, of apparatus suitable for use in carrying out a process of the invention.
Figure 2:
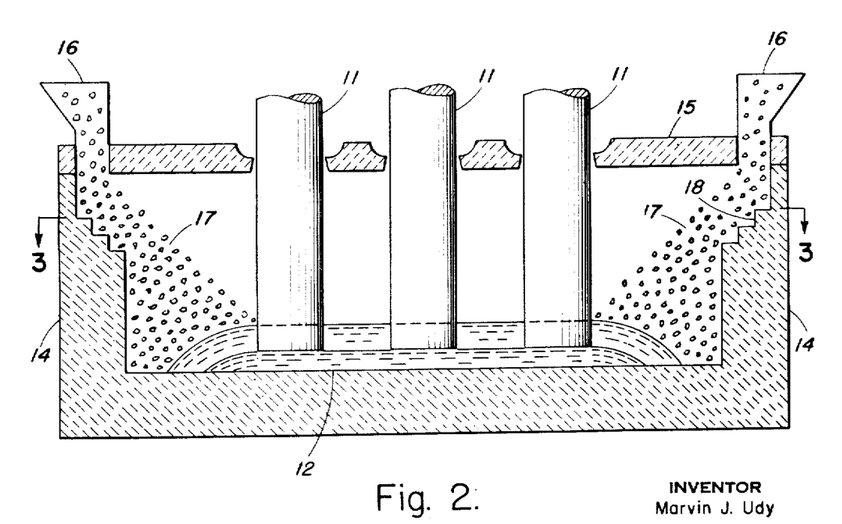
Fig. 2 is a sectional elevation taken substantially along the line 2—2 of Fig. 1.
Figure 3:
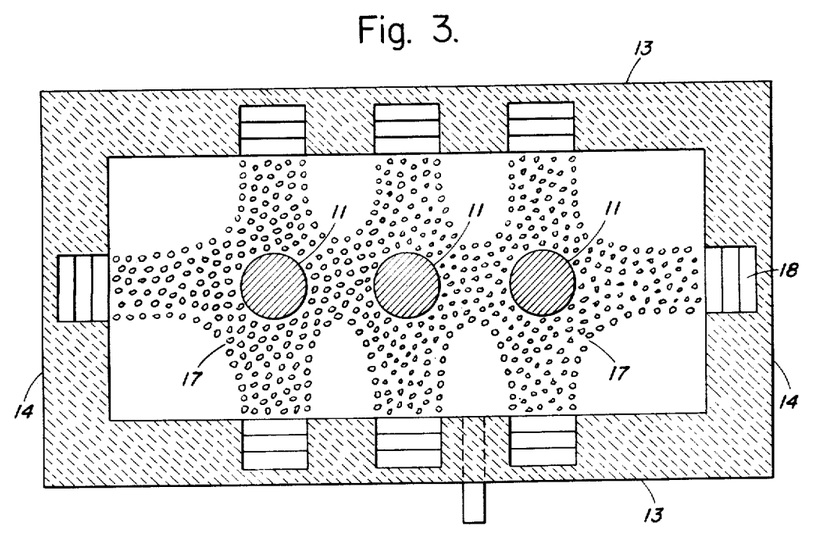
Fig. 3 is a sectional plan taken substantially along the lines 3—3 of Fig. 2.

The apparatus shown in the drawings comprises a covered electric furnace 10 provided with three substantially identical electrodes 11 supported by means of conventional holders (not shown) and electrically connected in circuit with conventional control and power supplying means (not shown), including transformer secondaries, voltage regulating means and automatic electrode positioning or adjusting means.

The arc electric furnace 10 is rectangular in horizontal cross-section and comprises a hearth or bottom portion 12, side walls 13, and walls 14 and a roof 15, all formed of appropriate refractory materials. An electric furnace of any suitable horizontal cross-sectional configuration may be employed.

The roof 15 is provided with suitable openings through which the electrodes 11 extend and which permit vertical movement of the electrodes in accordance with operational demands and characteristics. The spaces between the electrodes and the edges of the openings through which the electrodes extend or project may be provided with any suitable conventional packing or sealing means to inhibit or restrict or prevent the flow of gases between the interior and the exterior of the furnace without interfering with the necessary vertical movements of the electrodes.

Hoppers 16 having their lower portions extending through and sealed in openings in the roof 15 are provided adjacent the outer side edges and the end edges of the electric furnace in alignment with the electrodes to permit the introduction of charge materials 17 into the interior of the furnace.

The portions 18 of the side and end walls of the furnace immediately beneath the hoppers 16 preferably are so designed as to provide a slope corresponding to or equivalent to the angle of repose of the charge material. Preferably, the sloped portions of the walls are stepped or terraced, as shown in the drawings, to provide for the deposition and retention thereon of protective coatings of charge material.

A conduit assembly 19 communicates with the interior of the electric furnace 10 through an opening in the roof 15, with the interior of the rotary kiln 20 and with an air inlet 26 to permit the collection and utilization of carbon monoxide produced in the process.

The apparatus shown in Fig. 1 of the drawings includes the rotary kiln 20 communicating with a stationary dust collecting chamber 21 and provided with a hopper and chute or conduit arrangement 22 for introducing charge material thereinto at or about its point of highest elevation. At the opposite end of the rotary kiln, means are provided for introducing a combustible mixture of air and carbon monoxide produced in the electric furnace to permit utilization of the carbon monoxide for pre-heating charge material to be introduced into the electric furnace. The dust collecting chamber 21 is provided with a rotary sealing device 25 which permits withdrawal of collected dust particles without permitting ingress of air or other gas from the exterior.

A storage hopper or chamber 23 is provided for receiving the charge material from the rotary kiln, and a screw conveyor assembly 24 is provided for delivering heated charge material from the storage chamber 23 to the furnace hoppers 16 from where it is introduced into the electric furnace.

As indicated in the drawings and as described above, the rotary kiln 20 is operated under reducing conditions and at an elevated temperature in the range of 500° C. to 1300° C. and preferably in the range 1100° C. to 1300° C. to effect agglomeration of a finely divided mixture of ore (iron oxide-bearing material), light scrap iron or steel, fluxing material such as line (CaO) and coal with the production of a free-flowing granular product, heat being provided through combustion of the carbon monoxide produced in the arc electric furnace 10 and the volatile matter of the coal distilled from the coal in the kiln.

As contemplated by the invention, the kiln may function primarily as a cooling device in which hot gases from the arc electric furnace containing carbon monoxide are cooled and conditioned for subsequent treatment or utilization through contact with relatively cold (or low-temperature) charge materials within the kiln, in which event air preferably would be excluded from the interior of the kiln. Alternatively, provision may be made for by-passing the kiln and conducting the carbon monoxide directly to one or more other points of utilization. When air and the hot gases containing carbon monoxide are excluded from the interior of the kiln, the kiln functions primarily as a mixing device for producing an intimately mixed charge of finely divided iron oxide-bearing material, light scrap iron or steel, fluxing material and carbonaceous material which may be delivered to the arc electric furnace at substantially atmospheric temperature without granulation or agglomeration. At relatively low temperatures produced by the use of controlled relatively high rates of passage of charge materials through the kiln and controlled rates of heat development, the kiln functions primarily as a nodulizing or granulating device in which coal having a relatively low fusing or coking temperature acts as the bonding agent. At relatively high temperatures corresponding to sintering temperatures or temperatures of incipient fusion produced by the use of controlled relatively low rates of passage of charge materials through the kiln and controlled rates of heat development, the kiln functions as a reducing chamber for reducing a portion of the iron of the iron oxide-bearing material of the charge and, also, as a nodulizing or granulating device in which the softened non-carbonaceous materials or minerals of the charge function as the bonding agent or agents.

Any desired number of storage chambers 23 of any suitable size or sizes may be provided to permit storage of any desirable amount of pre-formed charge mixture suitable for introduction into the arc electric furnace 10. The storage chamber or chambers may be insulated to provide for retention of sensible heat of charge mixtures delivered thereinto from the rotary kiln, and charge mixtures may be withdrawn from storage and introduced into the arc electric furnace at any suitable temperature between atmospheric temperature and the temperature of discharge from the rotary kiln when heating of charge mixture is carried out in the rotary kiln. Reduction of a portion of the iron of the iron oxide in the rotary kiln reduces the reduction burden which must be imposed on the arc electric furnace with a resulting increase in the capacity of the arc electric furnace to produce molten iron. Retention of relatively high-temperature charge mixture in storage permits reduction of iron or iron oxide by means of carbonaceous material to proceed, thus providing for utilization of the sensible heat with consequent further reduction of the reducing burden imposed on the arc electric furnace and further increase in the capacity of the arc electric furnace to produce molten metallic iron. Delivery of the charge from the rotary kiln to the arc electric furnace at a high temperature provides further for reduction of the burden imposed on the arc electric furnace by eliminating the necessity for utilizing the electric furnace to provide all of the heat required for bringing the temperature of the charge up to reduction and melting temperatures. When the sintered charge is introduced into the arc electric furnace at a temperature above about 1000° C., reduction of iron in the electric furnace occurs almost instantaneously.

Apparatus of the type illustrated in the drawings may be utilized for the treatment of charges of any suitable types comprising iron oxide-bearing material, light scrap iron or steel, carbonaceous reducing and fluxing material. Thus, for example, the apparatus may be employed in treating a charge mixture comprising as components iron oxide-bearing ore, limestone for fluxing and coal for reduction of the compositions and in the proportions indicated below.

COMPOSITIONS OF COMPONENTS

Iron oxide-bearing ore

| | Percent |
|---|---|
| Ferric oxide ($Fe_2O_3$) | 83.7 |
| Iron (Fe) | 58.6 |
| Insoluble gangue material ($SiO_2+Al_2O_3$) | 9.6 |
| Phosphorus | Trace |
| Sulphur | Trace |

Light scrap iron and steel

| | |
|---|---|
| Iron (Fe) | 99.50+ |
| Carbon | 0.15 |
| Silicon | .20 |
| Phosphorus | Trace |
| Sulphur | Trace |

Coal

| | |
|---|---|
| Fixed carbon | 55.0 |
| Volatile matter | 35.0 |
| Sulphur | 0.4 |
| Ash ($SiO_2+Al_2O_3$) | 10.0 |

Limestone

| | |
|---|---|
| Calcium oxide (CaO) | 53.0 |

Charge mixture.—Per ton of metallic iron produced

| | Tons |
|---|---|
| Ore | 1.72 |
| Limestone | 0.325 |
| Coal | 0.50 |
| Light scrap iron and steel | 0.30 |

A charge of the above-indicated composition is introduced into the rotary kiln 20 through the hopper and chute arrangement 22. The charge preferably comprises or consists of solid particles of non-metallic materials small enough to pass a 4-mesh screen and particles of light scrap iron and steel having a maximum size of about one-half inch (½″) and the particles of the charge preferably are intimately mixed together prior to the introduction of the charge into the rotary kiln. As hereinbefore pointed out, the rotary kiln may be employed to effect intimate mixing of the particles of the charge. The kiln may be operated with or without utilization of heat to effect heating of the charge. When preliminary heating of the charge prior to its introduction into the arc electric furnace 10 is not desired, the components of the charge may be mixed in any suitable apparatus other than the kiln and the mixed charge may be introduced directly into the storage hopper 23 and conveyed from there to the furnace charging hoppers 16 by means of the screw conveyor 24, or, the mixed charge may be introduced directly from the mixing apparatus into the furnace charging hoppers 16.

When heating of the charge is desired in order to effect the production of a granular free-flowing product in which particles of the components are bonded together and held in intimate contact, heating may be accomplished by the introduction into the kiln and ignition therein of a combustible mixture of atmospheric air and carbon monoxide produced in the arc electric furnace 10 through the conduit arrangement 19. When combustible volatile matter of the coal is to be oxidized to provide additional heat, air is supplied in the amount required for oxidation of such volatile combustible matter in addition to the amount required for oxidation of the carbon monoxide. If additional heat should be required or desired, it may be supplied from any suitable source in any suitable manner. Usually, combustion of the carbon monoxide and the combustible matter of high-volatile matter coal, coupled with control of the rate of passage of the charge through the kiln, will provide all heat required for heating the charge to the highest desirable temperatures, such as sintering temperatures or temperatures of incipient fusion of the non-carbonaceous mineral particles, in the range of about 1100° C. to 1300° C. Reduction of iron oxide initiated in the rotary kiln will continue during the period of retention in the storage hopper of charge mixtures introduced thereunto at temperatures as high as and substantially lower than 1200° C.

Charge material as discharged from the rotary kiln 20 into the storage hopper 23 is conducted at a controlled rate by means of the screw conveyor 24 to the charging hoppers 16 from where it flows under the influence of gravity into the arc electric furnace and onto the surface of the molten slag bath therein. Figs. 1 and 2 of the drawings show two positions of the upper surface of the molten slag bath and two depths of molten slag and metal, described by legends applied to Fig. 1 as slag to metal, before tap and after tap. In Figs. 1 and 2, the electrodes are shown in one position only, the position they occupy after tapping when the volume of molten material in the furnace is relatively small. As indicated, the arcing tips of the electrodes are disposed at substantially the same level as the upper surface of the molten slag after tapping with short arcs shown as extending beneath the upper surface of the molten slag bath which condition exists because of electrical pressure created and maintained as long as the positions of the arcing tips are not sufficiently below the upper surface of the slag bath to permit wetting of the electrodes by the molten slag. The electrodes have been shown in position with respect to the upper surface of the molten slag bath after tapping only in order to avoid confusion and promote clarity. It will be understood that operating positions of the arcing tips of the electrodes before tapping will be the same or substantially the same with respect to the upper surface of the molten slag bath as shown with respect to the upper surface of the slag bath after tapping.

In the operation of the arc electric furnace 10, reduction of iron of the iron oxide of the charge material 17 placed on the surface of the molten slag bath is effected substantially entirely by heat contained in the molten slag bath and delivered thereto by means of arc-developed heat and resistance developed heat resulting from resistance to the flow therethrough of electric current passing between electrodes.

I claim:
1. In a process for producing metallic iron by reduction of the iron of iron oxide-bearing material containing gangue material, the improvement which comprises forming a charge comprising the iron oxide-bearing material, metallic iron-bearing material and fluxing material, heating the charge under reducing conditions to a temperature of incipient fusion and effecting (1) reduction to the metallic state of at least a portion of the iron of the iron oxide of the charge, (2) chemical combination of at least a portion of the unreduced iron oxide, fluxing material and gangue material of the charge and (3) the production of a granular, substantially free-flowing product comprising the metallic iron and the chemically combined iron oxide, fluxing material and gangue material, placing the granular product of the heating and reducing treatment without substantial dissipation of heat absorbed during the course of the heating and reducing treatment on the surface of a molten slag bath in a covered open-arc electric furnace provided with one or more vertically extending electrodes, said granular product being introduced into the furnace and onto the surface of the molten slag bath at points remote from the arc zones of the furnace electrodes, maintaining the molten slag bath at a temperature sufficiently high by means of combined electric arc and resistance heating to provide substantially all of the heat required for melting the components of the granular product with the production of molten metallic iron and molten slag, and separating the molten metallic iron from the molten slag, operation of the furnace during the course of the process being controlled to maintain the arcing tips of the one or more electrodes in sufficiently close proximity to the upper surface of the molten slag bath to inhibit dissipation of arc-developed heat by reflection and to insure delivery directly to the molten slag bath of substantially all of the arc-developed heat and the rate of introduction of charge material into the furnace and onto the surface of the molten slag bath therein being controlled to maintain a low pressure zone adjacent the arcing tips of the one or more electrodes.

2. In a process for producing metallic iron by reduction of the iron of iron oxide-bearing material containing gangue material, the improvement which comprises forming a charge comprising a finely divided, intimate mixture of the iron oxide-bearing material, metallic iron-bearing material, fluxing material and solid carbonaceous reducing material comprising coal having coking properties, heating the charge to a temperature of incipient fusion and effecting (1) reduction to the metallic state of a portion of the iron of the iron oxide of the charge, (2) chemical combination of at least a portion of the unreduced iron oxide, fluxing material and gangue material of the charge and (3) coking of the coal of the charge and (4) the production of a granular, substantially free-flowing product comprising solid carbon, metallic iron and the chemically combined iron oxide, fluxing material and gangue material, placing the granular product of the heating and reducing treatment without substantial dissipation of heat absorbed during the course of the heating and reducing treatment on the surface of a molten slag bath in a covered open-arc electric furnace provided with one or more vertically extending electrodes, said granular product being introduced into the furnace and onto the surface of the molten slag bath at points remote from the arc zones of the furnace electrodes, maintaining the slag bath by means of combined electric arc and resistance heating at a temperature sufficiently high to provide substantially all of the heat required for melting the metallic iron and the chemically combined components of the granular product and for promoting and effecting reduction of the iron of unreduced iron oxide of the granular product by means of carbon contained therein with the production of molten metallic iron and molten slag, and separating the molten metallic iron from the molten slag, operation of the furnace during the course of the process being controlled to maintain the arcing tips of the one or more electrodes in sufficiently close proximity to the upper surface of the molten slag bath to inhibit dissipation of arc-developed heat by reflection and to insure delivery directly to the molten slag bath of substantially all of the arc-developed heat and the rate of introduction of charge material into the furnace and onto the surface of the molten slag bath therein being controlled to maintain a low-pressure zone adjacent the arcing tips of the one or more electrodes.

3. In a process for producing metallic iron by reduction of the iron of iron oxide-bearing material containing gangue material, the improvement which comprises forming a charge comprising a finely divided, intimate mixture of the iron oxide-bearing material, metallic iron-bearing material, fluxing material and solid carbonaceous reducing material, heating the charge to a temperature of incipient fusion and effecting (1) reduction to the metallic state of a portion of the iron of the iron oxide of the charge, (2) chemical combination of at least a portion of the unreduced iron oxide, fluxing material and gangue material of the charge and (3) the production of a granular, substantially free-flowing product comprising metallic iron and the chemically combined iron oxide, fluxing material and gangue material, placing the granular product of the heating and reducing treatment without substantial dissipation of heat absorbed during the course of the heating and reducing treatment on the surface of a molten slag bath in a covered open-arc electric furnace provided with one or more vertically extending electrodes, maintaining the slag bath by means of combined electric arc and resistance heating at a temperature sufficiently high to provide substantially all of the heat required for melting the metallic iron and the chemically combined components of the granular product with the production of molten metallic iron and molten slag, and separating the molten metallic iron from the molten slag, operation of the furnace during the course of the process being controlled to maintain the arcing tips of the one or more electrodes in sufficiently close proximity to the upper surface of the molten slag bath to provide for the maintenance of arcs not greater in length than about one-half inch thus to inhibit dissipation of arc-developed heat by reflection and to insure delivery directly to the molten slag bath of substantially all of the arc-developed heat and the rate of introduction of charge material into the furnace and onto the surface of the molten slag bath therein being controlled to maintain a low-pressure zone adjacent the arcing tips of the one or more electrodes by supplying said charge material to the furnace at points remote from the arc zones of the electrodes and limiting the depth of charge material around the electrodes to a depth of only a few inches.

4. In a process for producing metallic iron by reduction of the iron of iron oxide-bearing material containing gangue material, the improvement which comprises forming a charge comprising the iron oxide-bearing material, metallic iron-bearing material and fluxing material, heating the charge under reducing conditions to a temperature of incipient fusion and effecting (1) reduction to the metallic state of at least a portion of the iron of the iron oxide of the charge, (2) chemical combination of at least a portion of the unreduced iron oxide, fluxing material and gangue material of the charge and (3) the production of a granular, substantially free-flowing product comprising the metallic iron and the chemically combined iron oxide, fluxing material and gangue material, placing the granular product of the heating and reducing treatment without substantial dissipation of heat absorbed during the course of the heating and reducing treatment on the surface of a molten slag bath in a covered open-arc electric furnace provided with one or more vertically extending electrodes, maintaining the molten slag bath at a temperature sufficiently high by means of combined electric arc and resistance heating to provide substantially all of the heat required for melting the components of the granular product with the production of molten metallic iron and molten slag, and separating the molten metallic iron from the molten slag, operation of the furnace during the course of the process being controlled to maintain the arcing tips of the one or more electrodes in positions with respect to the vertical between about one-half (½") inch above the upper surface of the molten slag bath and about two (2") inches below the upper surface of the molten slag bath to inhibit dissipation of arc-developed heat by reflection and to insure delivery directly to the molten slag bath of substantially all of the arc-developed heat and the rate of introduction of charge material into the furnace and onto the surface of the molten slag bath therein being controlled to maintain a low-pressure zone adjacent the arcing tips of the one or more electrodes by supplying said charge material to the furnace at points remote from the arc zones of the electrodes and limiting the depth of charge material around the electrodes to a depth of only a few inches.

5. In a process for producing metallic iron by reduction of the iron of iron oxide-bearing material containing gangue material, the improvement which comprises forming a charge comprising a finely divided, intimate mixture of the iron oxide-bearing material, metallic iron-bearing material, fluxing material and solid carbonaceous reducing material comprising coal having coking properties, heating the charge to a temperature of incipient fusion and effecting (1) reduction to the metallic state of a portion of the iron of the iron oxide of the charge, (2) chemical combination of at least a portion of the unreduced iron oxide, fluxing material and gangue material of the charge and (3) coking of the coal of the charge and (4) the production of a granular, substantially free-flowing product comprising solid carbon, metallic iron and the chemically combined iron oxide, fluxing material and gangue material, placing the granular product of the heating and reducing treatment without substantial dissipation of heat absorbed during the course of the heating and reducing treatment on the surface of a molten slag bath in a covered open-arc electric furnace provided with one or more vertically extending electrodes, maintaining the slag bath by means of combined electric arc and resistance heating at a temperature sufficiently high to provide substantially all of the heat required for melting the metallic iron and the chemically combined components of the granular product and for promoting and effecting reduction of the iron of unreduced iron oxide of the granular product by means of carbon contained therein with the production of molten metallic iron and molten slag, and separating the molten metallic iron from the molten slag, operation of the furnace during the course of the process being controlled to maintain the arcing tips of the one or more electrodes in positions with respect to the vertical between about one-half (½") inch above the upper surface of the molten slag bath and about two (2") inches below the upper surface of the molten slag bath to inhibit dissipation of arc-developed heat by reflection and to insure delivery directly to the molten slag bath of substantially all of the arc-developed heat and the rate of introduction of charge material into the furnace and onto the surface of the molten slag bath therein being controlled to maintain a low-pressure zone adjacent the arcing tips of the one or more electrodes by supplying said charge material to the furnace at points remote from the arc zones of the electrodes and limiting the depth of charge material around the electrodes to a depth of only a few inches.

6. In a process for producing metallic iron by reduction of the iron of iron oxide-bearing material containing gangue material, the improvement which comprises forming a charge comprising a finely divided, intimate mixture of the iron oxide-bearing material, metallic iron-bearing material, fluxing material and solid carbonaceous reducing material, heating the charge to a temperature of incipient fusion and effecting (1) reduction to the metallic state of a portion of the iron of the iron oxide of the charge, (2) chemical combination of at least a portion of the unreduced iron oxide, fluxing material and gangue material of the charge and (3) the production of a granular, substantially free-flowing product comprising metallic iron and the chemically combined iron oxide, fluxing material and gangue material, placing the granular product of the heating and reducing treatment without substantial dissipation of heat absorbed during the course of the heating and reducing treatment on the surface of a molten slag bath in a covered open-arc electric furnace provided with one or more vertically extending electrodes, maintaining the slag bath by means of combined electric arc and resistance heating at a temperature sufficiently high to provide substantially all of the heat required for melting the metallic iron and the chemically combined components of the granular product with the production of molten metallic iron and molten slag, and separating the molten metallic iron from the molten slag, operation of the furnace during the course of the process being controlled to maintain the arcing tips of the one or more electrodes in positions with respect to the vertical between about one-half inch (½") above the upper surface of the molten slag bath and about two inches (2") below the upper surface of the molten slag bath and to maintain between the arcing tips of the electrodes and molten iron beneath the molten slag bath a layer of slag at least one inch in depth, thereby to inhibit dissipation of arc-developed heat by reflection to insure delivery directly to the molten slag bath of substantially all of the arc-developed heat and to maintain the arc-resistance heating character of the operation, the rate of introduction of charge material into the furnace and onto the upper surface of the molten slag bath therein being controlled to maintain a low-pressure zone adjacent the electrodes by supplying said charge material to the furnace at points remote from the arc zones of the electrodes and limiting the depth of charge material around the electrodes to a depth of only a few inches.

References Cited in the file of this patent

UNITED STATES PATENTS

| | | |
|---|---|---|
| 1,477,135 | Lash | Dec. 11, 1923 |
| 1,686,207 | Flodin et al. | Oct. 2, 1928 |
| 1,751,083 | Gustafsson | Mar. 18, 1930 |
| 1,857,779 | Flodin et al. | May 10, 1932 |
| 2,098,176 | Udy | Nov. 2, 1937 |
| 2,349,688 | Wood | May 23, 1944 |
| 2,523,092 | Bryk et al. | Sept. 19, 1950 |
| 2,526,658 | Harman et al. | Oct. 24, 1950 |
| 2,582,469 | Udy | Jan. 15, 1952 |

FOREIGN PATENTS

| | | |
|---|---|---|
| 22,236 | Great Britain | of 1911 |

UNITED STATES PATENT OFFICE

CERTIFICATE OF CORRECTION

Patent No. 2,805,930 September 10, 195

Marvin J. Udy

It is hereby certified that error appears in the printed specification of the above numbered patent requiring correction and that the said Letters Patent should read as corrected below.

Column 15, line 53, claim 4, after the syllables and hyphen "reflec-" and before "bath" in line 54, insert -- tion and to insure delivery directl the molten slag --.

Signed and sealed this 19th day of November 1957.

(SEAL)
Attest:

KARL H. AXLINE
Attesting Officer

ROBERT C. WATSON
Commissioner of Patents